P. A. WOOD.
TRAILER ATTACHMENT FOR AUTOMOBILES.
APPLICATION FILED DEC. 11, 1916.
1,250,066.
Patented Dec. 11, 1917.
3 SHEETS—SHEET 3.
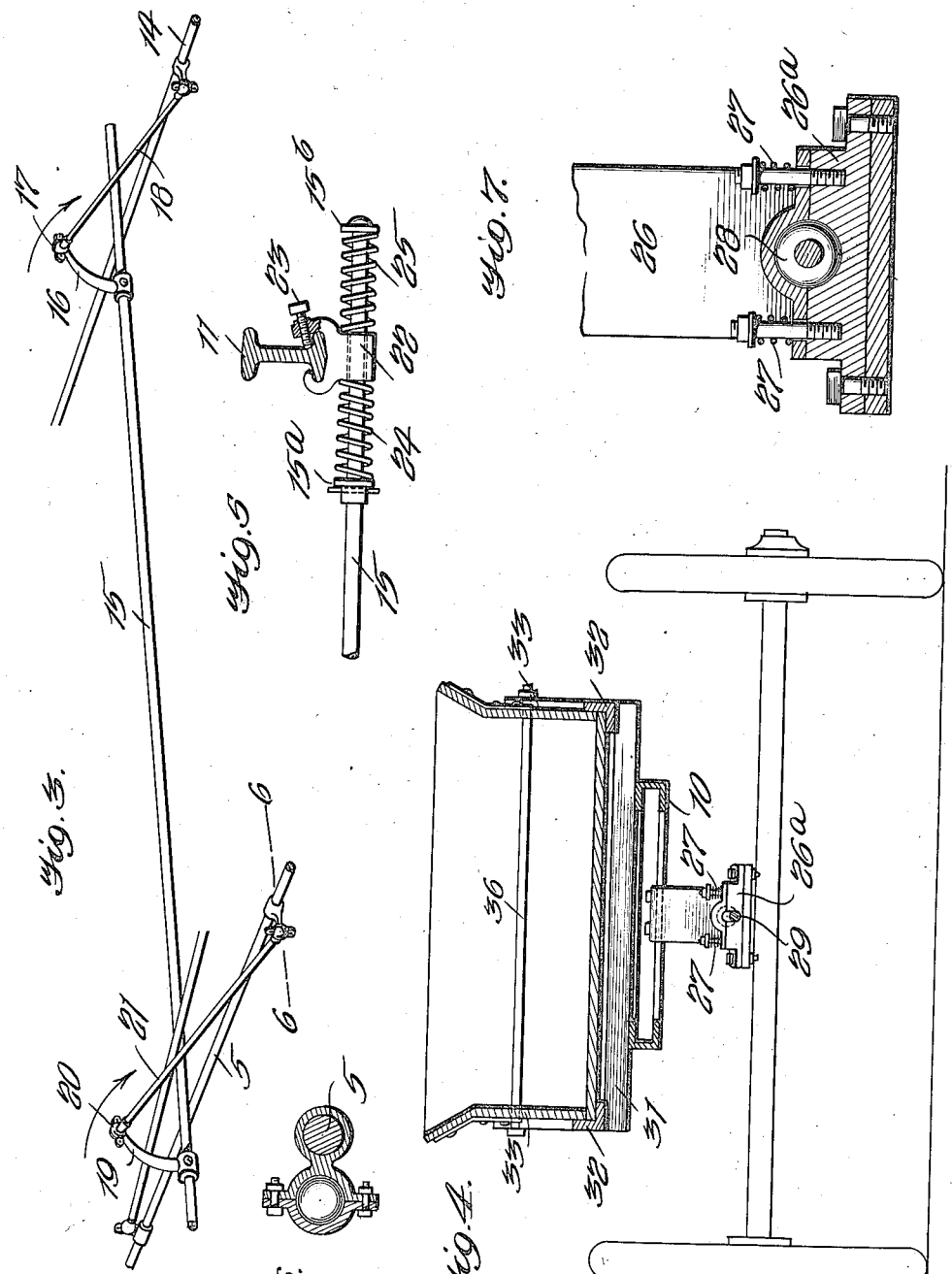
WITNESSES
E. H. Carraghan
W. E. Beck
INVENTOR
PINCKNEY A. WOOD,
BY
ATTORNEYS

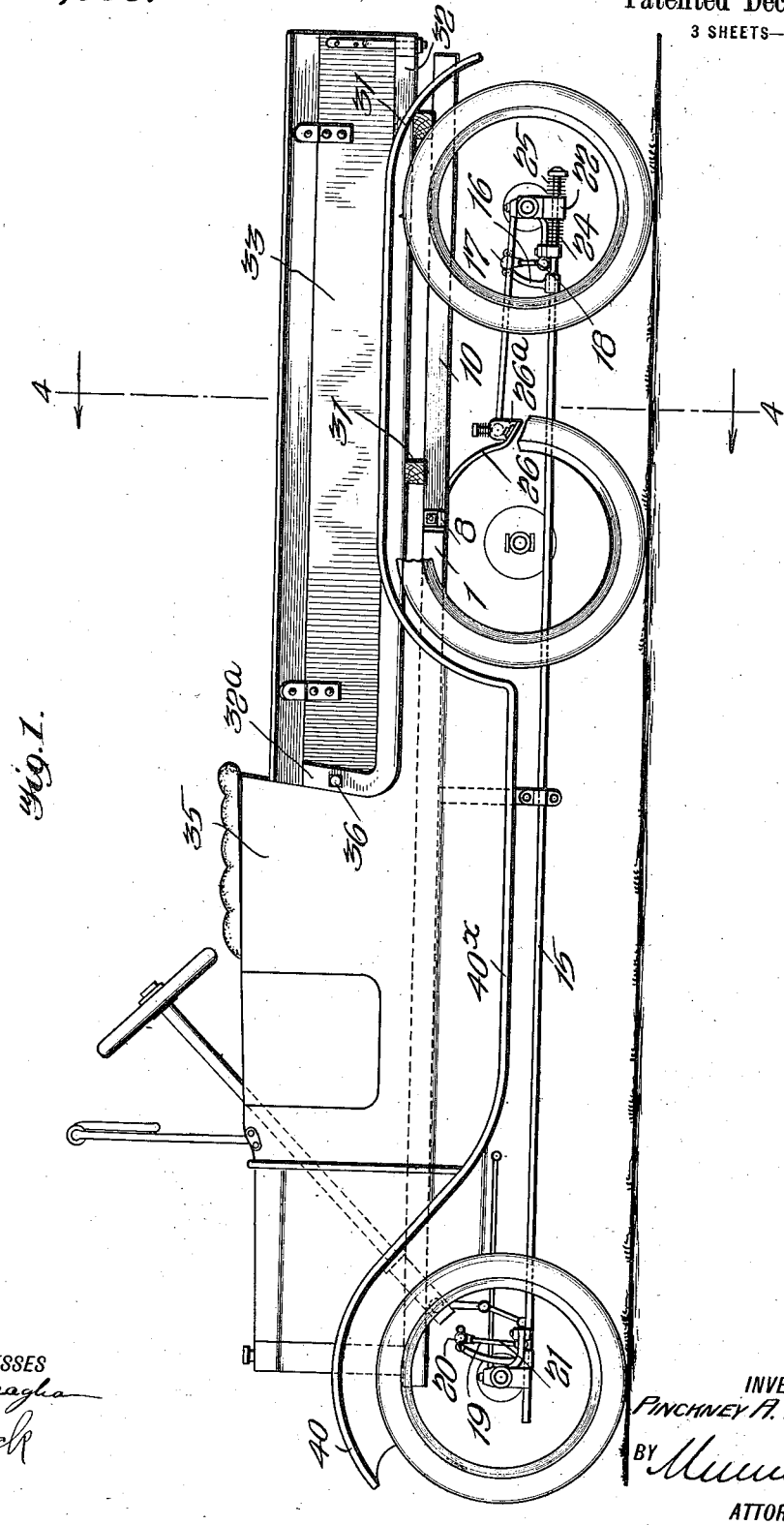

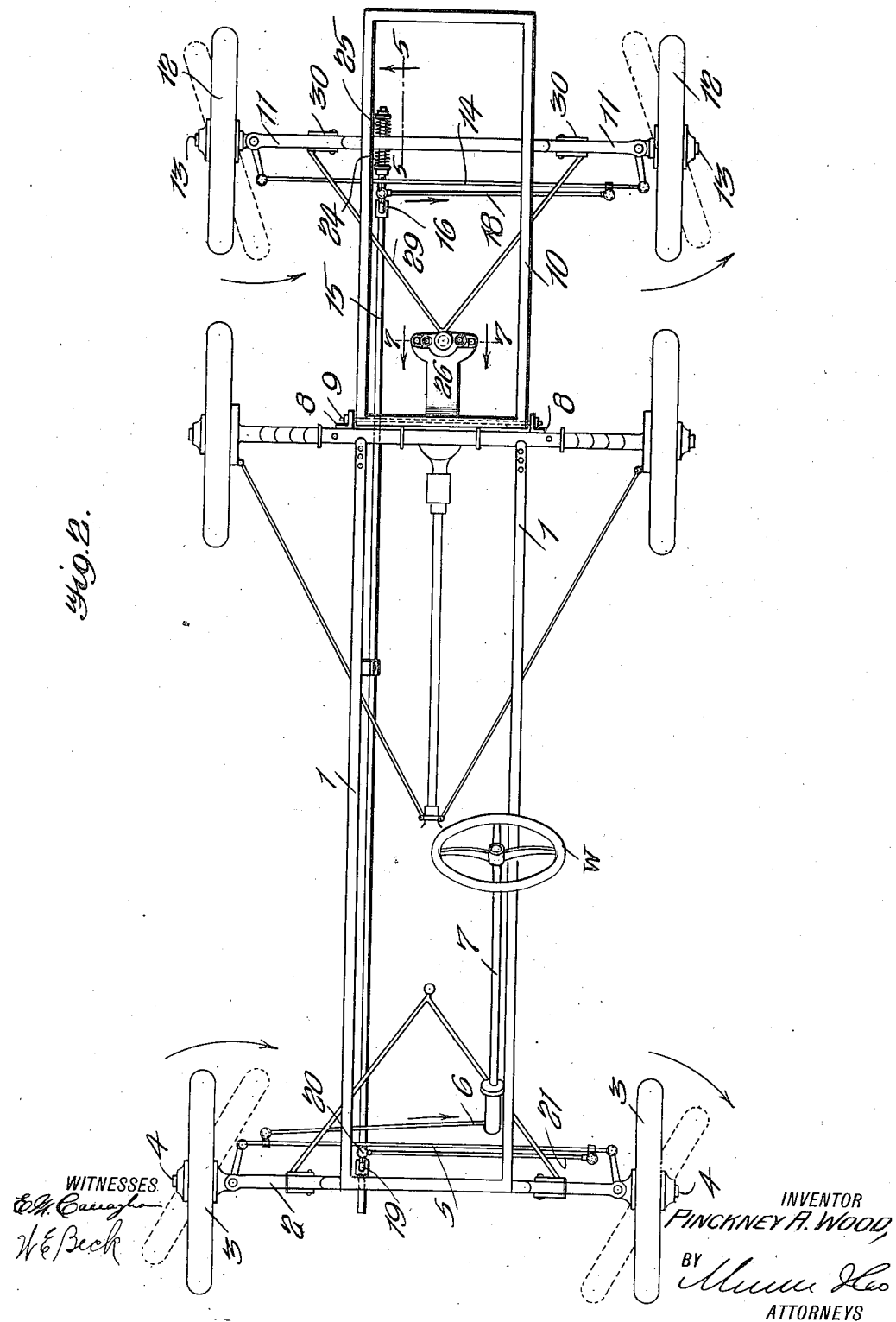

UNITED STATES PATENT OFFICE.

PINCKNEY A. WOOD, OF WASHINGTON, DISTRICT OF COLUMBIA, ASSIGNOR OF ONE-FOURTH TO THOMAS U. SISSON, OF WINONA, MISSISSIPPI, ONE-FOURTH TO RICHARD M. TROTTER, OF WEST POINT, MISSISSIPPI, AND ONE-FOURTH TO BARRY GILLESPIE, OF DUCK HILL, MISSISSIPPI.

TRAILER ATTACHMENT FOR AUTOMOBILES.

1,250,066.      Specification of Letters Patent.      Patented Dec. 11, 1917.

Application filed December 11, 1916. Serial No. 136,200.

*To all whom it may concern:*

Be it known that I, PINCKNEY A. WOOD, a citizen of the United States, and a resident of the city of Washington, in the District of Columbia, have invented a certain new and useful Improvement in Trailer Attachments for Automobiles, of which the following is a specification.

My invention relates to improvements in trailer attachments for automobiles, and it consists in the combinations, constructions, and arrangements herein described and claimed.

An object of my invention is to provide a trailer which may be attached to the chassis of an automobile so as to be drawn thereby, means being provided for turning the wheels of the trailer so as to steer the latter and thereby prevent the skidding of the trailer due to the momentum of the latter and its load when turning corners.

A further object of my invention is to provide means for turning the wheels of the trailer so as to aid in steering the device, thus permitting the vehicle to turn in less space than would ordinarily be required.

A further object of my invention is to provide means whereby the wheels of the trailer portion are turned to a less extent than the front wheels.

A further object of my invention is to provide means for compensating for the movement of the trailer with respect to the frame.

Other objects and advantages will appear in the following specification, and the novel features of the invention will be particularly pointed out in the appended claims.

My invention is illustrated in the accompanying drawings, forming a part of this application, and in which—

Figure 1 is a side view of the device;

Fig. 2 is a plan view;

Fig. 3 is a perspective view of a portion of the steering apparatus;

Fig. 4 is a section on the line 4—4 of Fig. 1;

Fig. 5 is an enlarged section on the line 5—5 of Fig. 2;

Fig. 6 is a section along the line 6—6 of Fig. 3, and

Fig. 7 is a section along the line 7—7 of Fig. 2.

In carrying out my invention, I make use of any suitable automobile, although the device is primarily adapted for the Ford automobile. Referring now particularly to Fig. 2, 1 denotes the chassis of the automobile, which has the usual front axle 2 whose front wheels 3 are pivotally secured thereto by the steering knuckles 4, these being in turn connected by a common steering rod 5 which is connected with the steering wheel by a link 6 attached at the end of the steering wheel rod 7.

Secured to the chassis 1 at the rear end thereof, are brackets 8, these brackets having a pin or rod 9 to which the bed frame 10 of the trailer is pivotally secured. The latter has an axle 11 to which wheels 12 are secured by means of the steering knuckles 13 which are joined together by a common steering rod 14.

As will be seen from Figs. 2 and 3, a longitudinal connecting rod 15 is provided at its rear end with a curved arm 16 having a ball and socket joint 17, the latter being connected by means of the link 18 with the rod 14. At the forward end of the rod 15 is a curved arm 19 which is longer than the arm 16 and which is connected with the rod 5 by means of a joint 20 and link 21 similar to the joint 17 and link 18 at the rear end of the device.

The rear end of the rod 15 passes through a bracket 22 which is secured to the rear axle 11 by means of a clamp 23, see Fig. 5. The rod 15 is provided with washers $15^a$ and $15^b$, on opposite sides of the bracket, these washers abutting fixed portions of the rod. Springs 24 and 25 on opposite sides of the bracket 22 afford means for permitting the longitudinal movement of the rod 15 due to the movement of the parts of the vehicle.

Secured to the front portion of the frame 10 is a bracket 26 which extends downwardly and rearwardly, and which is provided at its end with a ball and socket joint $26^a$. The latter is provided with springs 27 for holding the parts of the joint together. This joint or connection incloses the round end 28 of the radius rods 29 which are secured to the axle 11 at 30.

The body of the trailer proper consists of the frame 10 upon which are cross members 31, these being surmounted by L-shaped side members 32 bearing the wagon box 33. The side members 32 are bent upwardly at their forward ends, as shown at 32ª in Fig. 1, and are secured to the body 33 of the trailer by means of bolts 36.

From the foregoing description of the various parts of the device, the operation thereof may be readily understood.

In turning the vehicle, the wheel W is turned in the usual manner and the front wheels 3 are turned to the dotted line position shown in Fig. 2. This moves the arm 19, see Fig. 3, through the medium of the members 5, 6, 21, and 20, rocking the shaft 15 and causing the rotation of the arm 16, thus imparting movement to the rod 14 in the same direction but not to the same extent. Thus, where the front wheels are turned to a forty-five degree position, the trailer wheels are substantially turned thirty degrees, by making the arm 16 shorter than the arm 19.

By pivotally connecting the trailer to the chassis of the automobile, the former may have movement relatively to the latter to compensate for irregularities in the road bed. The provision of the ball and socket joint and the radius rods of the trailer also insure flexibility of the device and prevent breaking of parts. Fenders 40 extend over the front wheels rearwardly, forming running boards and thence are bent upwardly, extending over the rear wheels of the automobile and the wheels of the trailer.

As will be seen from the drawings, the body portion 33 of the trailer extends forwardly over the rear part of the automobile, thereby enlarging the capacity of the trailer.

The device described above provides a chassis or automobile frame and a trailer frame, the two being rigidly connected together as far as any lateral movement is concerned, and pivotally connected together as far as motion upwardly or downwardly is concerned. The extent to which the wheels of the trailer are turned, as compared with the turning of the front wheels of the automobile, depends upon the length of the trailer. If the trailer were extended so that the wheels of the trailer and the front wheels of the automobile were the same distance from the rear wheels of the automobile, then the wheels of the trailer and the front wheels of the automobile would be turned the same distance but in opposite directions, thus making the axis of the rear wheels the line upon which the turning point is located. Where the trailer is shorter than the automobile, as is usually the case, the wheels of the trailer are not turned as far as the front wheels of the automobile, as stated above, but the central turning point is still on the line between the rear wheels.

The ordinary trailer which has no steering means for its wheels, in passing around a corner, must necessarily skid, due to its momentum, if it is rigidly connected as far as lateral motion is concerned. By providing means for steering the wheels of the trailer this lateral skidding is entirely eliminated and at the same time the further advantage is gained of being able to turn the automobile and its trailer in much less space than would otherwise be required.

I claim:—

1. The combination with an automobile, of a trailer pivotally connected with the chassis of the automobile, said trailer having a pair of wheels, each of said wheels being mounted on a steering knuckle, and a common steering rod for connecting said steering knuckles, a shaft disposed longitudinally of the automobile and trailer, means connected with the steering apparatus of the automobile for operating said shaft, means carried by the shaft for moving said common steering rod to turn the steering knuckles of the trailer wheel in a direction opposite to that in which the front wheels of the vehicle are turned, and spring means for permitting the longitudinal movement of the shaft.

2. The combination with an automobile, of a trailer pivotally connected with the chassis of the automobile, said trailer having a pair of wheels, each of said wheels being mounted on a steering knuckle and a common steering rod for connecting said steering knuckles, a rock shaft disposed longitudinally of the automobile and trailer, means connected with the steering apparatus of the automobile for oscillating said rock shaft, means carried by said rock shaft for moving said common steering rod to turn the steering knuckles of the trailer wheels in a direction opposite to that in which the front wheels of the vehicle are turned, and spring means for permitting the longitudinal movement of the rock shaft.

3. The combination with an automobile, of a trailer having a pair of wheels, the bed frame of the trailer being pivotally connected to the chassis of the automobile at the rear end thereof, a bracket carried by the frame of the trailer, a ball and socket joint disposed on said bracket, radius rods secured to the axle of the trailer, the rounded ends of said radius rods being arranged to enter said ball and socket joint.

4. The combination with an automobile, of a trailer having a pair of wheels, the bed frame of the trailer being pivotally connected to the chassis of the automobile at the rear end thereof, a bracket carried by the frame of the trailer, a ball and socket joint disposed on said bracket, radius rods secured to the axle of the trailer, the rounded ends of said radius rods being arranged to enter said ball and socket joint, and a body carried by the bed frame of the trailer, and extending forwardly at the rear portion of the automobile.

5. The combination with an automobile, of a trailer, the bed frame of the trailer being pivotally connected to the chassis of the automobile at the rear end thereof to move about a horizontal axis, said trailer frame being rigidly connected with the frame of the chassis to prevent movement in a lateral direction, a bracket carried by the frame of the trailer, a universal joint carried by said bracket, and radius rods secured to the axle of the trailer and having connection with said universal joint.

6. The combination with an automobile capable of relatively high speed, of a trailer pivotally connected to the chassis of said automobile for movement in a vertical direction, and being rigidly connected to prevent movement in a lateral direction, said trailer having a pair of wheels, connections from the steering apparatus of the automobile for turning the wheels of the trailer simultaneously with the front wheels of the automobile and in opposite directions to the latter, said trailer wheels being turned so as to bring the central turning point of the combined automobile and trailer on the axial line of the rear wheels of the automobile.

7. The combination with an automobile capable of relatively high speed, of a trailer having a bed frame pivotally connected to the bed frame of the automobile for movement in a vertical direction, and being rigidly connected to prevent movement in a lateral direction, said trailer having a pair of wheels, connections from the steering apparatus of the automobile for turning the wheels of the trailer simultaneously with the front wheels of the automobile and in opposite directions to the latter, said trailer wheels being turned so as to bring the central turning point of the said automobile and trailer on the axial line of the rear wheels of the automobile, a bracket carried by the frame of the trailer, a universal joint carried by the trailer, and radius rods secured to the axle of the trailer, and having connection with said universal joint.

PINCKNEY A. WOOD.